United States
Korpel

[11] 3,794,975
[45] Feb. 26, 1974

[54] SYSTEM FOR TRANSLATING SOUND-BORNE CHARACTER OR PATTERN INFORMATION INTO OPTICAL FORM

[75] Inventor: Adrianus Korpel, Prospect Heights, Ill.

[73] Assignee: Zenith Radio Corporation, Chicago, Ill.

[22] Filed: Jan. 3, 1972

[21] Appl. No.: 214,977

[52] U.S. Cl. ........................... 340/146.3 F, 350/161
[51] Int. Cl. ................................................ G06k 9/00
[58] Field of Search ............... 350/161; 340/146.3 F

[56] References Cited
UNITED STATES PATENTS

| | | | |
|---|---|---|---|
| 2,513,520 | 7/1950 | Rosenthal | 350/161 |
| 3,457,425 | 7/1969 | Preston | 350/161 |
| 3,502,879 | 3/1970 | Vallese | 350/161 |
| 3,424,906 | 1/1969 | Korpel | 350/161 |
| 3,397,936 | 8/1968 | Frayne | 350/161 |

Primary Examiner—Paul J. Henon
Assistant Examiner—Robert F. Gnuse
Attorney, Agent, or Firm—John H. Coult

[57] ABSTRACT

In a light-sound interaction cell, a plurality of spatially separated individual acoustic transducers are selectively energized to form a sound image of a character or other spatial pattern. A beam of light is projected through the light-sound interaction cell, the light being diffracted by the acoustic field established by the transducers. A Bragg image of that field is formed and projected upon an image plane to reproduce optically in the image plane an image of the desired pattern.

22 Claims, 8 Drawing Figures

SYSTEM FOR TRANSLATING SOUND-BORNE CHARACTER OR PATTERN INFORMATION INTO OPTICAL FORM

BACKGROUND OF THE INVENTION

The present invention pertains to acousto-optic character displays. More particularly, it relates to the selective display of spatial patterns such as alphanumeric characters, including other patterns such as dot matrices or even patterns which constitute pictorial images of various objects, by means of light which is diffracted by sound.

Substantial progress has been made in recent years in the provision of visual displays that permit the selection at any particular time of one from among a number of possible patterns, numerals or letters. Such displays presently find use, for example, in electronic counters, calculating machines, computer printout on microfilm (COM), the read-in or storage of information in memories and even cash registers.

In a somewhat rudimentary form, the display device may include a ground-glass or equivalent screen, or a sheet of photographic film, upon which an image of the character is displayed by passing light, from an approximate point source, through a mask, the character to be displayed being defined by cut-out portions in the mask. Another approach involves the use of an array of gas-discharge devices, the devices being energizable in different combinations so as to form the desired character. As another example, light-emitting diodes may be arranged in a matrix, the different diodes again being selectively energizable in various combinations so as to define different ones of a plurality of characters.

It is accordingly, a general object of the present invention to provide a new and improved character display, one which utilizes a different basic mode of operation so as to offer at least an attractive alternative to earlier character displays.

In the general field of image display, considerable interest has been devoted to the use of light beams, usually in a system in which the beam is repetitively deflected in a repetitive pattern so as to define an image raster. By modulating the intensity of the light as the raster is scanned, a picture is reproduced. One attractive technique of this sort involves the use of acoustic waves for diffracting, and hence deflecting, the beam of light.

Diffraction of light by sound has also found substantial interest in the field of acoustic imaging and holography for the purpose of examining and reproducing minute detail of an object or specimen under study. For example, U.S. Pat. No. 3,488,438, issued Jan. 6, 1970, describes and claims an acoustic microscope. For that purpose, a specimen is placed in the sound-conducting medium of a light-sound interaction cell through which a laser beam is projected. The incident coherent light beam is variably diffracted in a pattern reflecting non-uniformities in the sound field that are attributed to the presence of the specimen. For use in an optical system, the pattern or non-uniformities is projected onto a remote image plane.

Another object of the present invention is to provide a new and improved information translation system that takes advantage of certain principles underlying the diffraction or light by sound in order to achieve the selective display of any one of a number of different patterns, including alphanumeric characters, either serially or simultaneously.

Still another object of the invention is to provide a system of the foregoing kind having a holographic capability, with a superior principle of operation and a more diversified and advanced capability compared to prior art systems, for example as described in U.S. Pat. No. 3,626,753, "Acousto-Holographic Method and Apparatus for Internally Imaging and Interferometrically Analyzing Objects," patented Dec. 14, 1971.

Yet another object of the invention is to provide a system of the aforementioned acoustic microscope kind having a holographic capability.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings and in which:

DESCRIPTION OF THE PREFERRED EMBODIMENT

Figure 1:
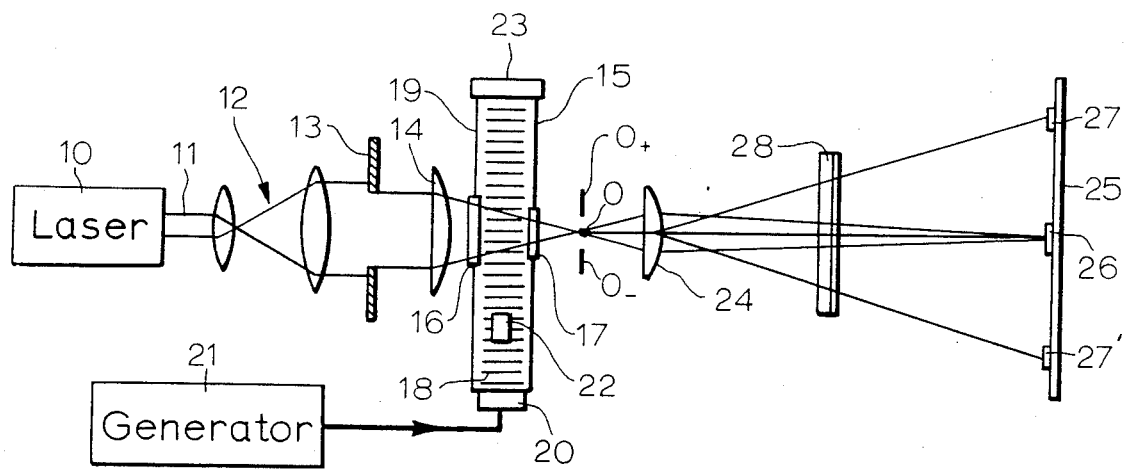
FIG. 1 is a schematic diagram of a prior-art acoustic microscope system of the above-mentioned Letters Patent.

Because the present invention constitutes an advancement into a different field of utility of certain basic principles involved in the aforesaid Letters Patent, it is believed helpful first to re-examine certain features of the subject matter of that patent. Accordingly, FIG. 1 has been taken therefrom. Referring first to FIG. 1, a laser 10 develops a light beam 11. Beam 11 is enlarged in cross-section by a telescope 12 and then shaped by an aperture in a plate 13. The resulting collimated beam is focused into a line source at 0 by a cylinder lens 14. Thus, a converging beam of light enters into and exists from a light-sound interaction cell 15 by way of transparent windows 16 and 17. In this case, line source 0 is formed to the right or beyond sound waves 18 in cell 15 so that certain resultant images, to be described further are real rather that virtual. However, since the diverging beam also may be useful in some applications, the important factor is that the beam within the cell be caused to have an actual effective degree of angular spread. Sound waves 18 are launched in water 19 contained by cell 15 through the action of a transducer 20 driven by a signal generator 21; such sound waves are of a frequency chosen as set forth in the aforementioned reference suitable for obtaining Bragg interaction with the light of beam 11. An object 22 under study is disposed in the path of sound waves 18 ahead of the light beam. To prevent sound wave reflection, an acoustic absorber 23 preferably is disposed opposite transducer 20.

As may be seen in more detail in the referenced patent, the propagating sound waves in cell 15 represent an acoustic field. Along the sound wavefronts transverse to the sound propagation direction, the acoustic field ordinarily is of uniform intensity. But in the presence of object 22, the sound field along such wavefronts is caused to be non-uniform in a manner representative of that object. The system enables any cross-section of the acoustic field to be reconstructed purely by optical means from an analogue light field which appears through Bragg diffraction of light about the source 0 by the image-bearing sound field illuminated by the light beam. The cylinder lenses 24 and 28 beyond line source 0 act to project the upshifted and downshifted Bragg images $0_+$ and $0_-$ corresponding respectively to the positive and negative Bragg angles of diffraction light, and which produced respectively above and below line source 0, onto screen 25 to define images 27 and 27'. The focus of lenses 24 and 28 may be adjusted so that images 27 and 27' represent different particular sound wave cross-sections. As illustrated, these lenses are positioned to image the sound wave pattern of object 22 which is disposed in the sound path.

Preferably, lens 24 is assigned a magnification value of $1/M$ as was taught in the referenced patent, where $M = \lambda/\Lambda$, $\lambda$ being the wavelength of the light and $\Lambda$ the sound wavelength, $M$ being the demagnification which is inherent in the basic Bragg process, which the magnification value of the lens will cancel. Imaging in the orthogonal direction, vertical to the plane of the drawing, is obtained simply by virtue of lens 28, although in many instances, depending on the distance within the cell 15 between the light beam and the cross-section of the acoustic field desired to be imaged and whether the upshifted or downshifted Bragg image is preferred, lens 28 may not be necessary. No demagnification is involved in this orthogonal direction so that the cylinder lens 28, which has its curvature at right angles to cylinder lenses 24 and 25, should project the image with a magnification of unity.

Figure 2:
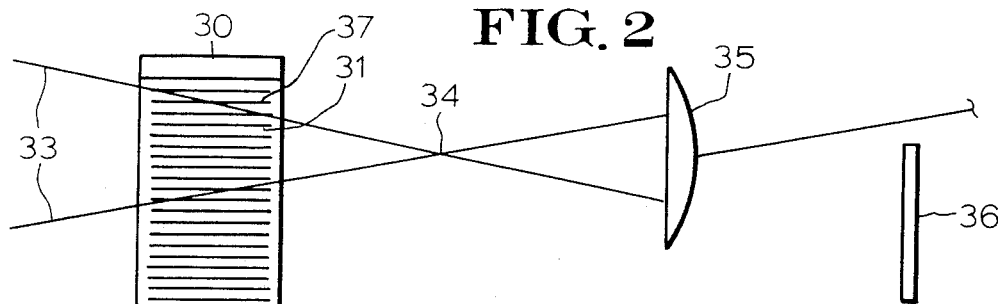
FIG. 2 is a schematic, partially in block diagram form, of a system related to that of FIG. 1 for the display of information characters.

The system of FIG. 2 includes a light-sound interaction cell 30 that contains or includes a light-transparent sound-conducting medium 31 such as water. As in FIG. 1, a beam 33 of substantially coherent and monochromatic light is focused through cell 30 into an effective line source 34 that is disposed transversely to the plane of the drawing, although in many applications source 34 could be other than a line source, particularly a point source. Also the beam could instead be a diverging one as it passes through the cell, since the important factor is that the light within the cell have an actual effective degree of angular spread. Disposed further on in the path of the light beam is an optical system that images line source 34 upon an image plane not shown in FIG. 2 but located in the same position as and corresponding to image plane 25 of FIG. 1. Also as in the latter figure, the optical system in FIG. 2 is exemplified as constituting simply a cylinder lens 35, although in practice it may be a complicated anamorphic system of lenses to compensate the demagnification factor $M$. So that only a single image is permitted to be reproduced upon the image plane, a stop 36 is located beyond lens 35 in a position to block transmission of the downwardly diffracted one of the first-order pair of diffracted images as well as the undiffracted portion of the light beam.

Figure 3:
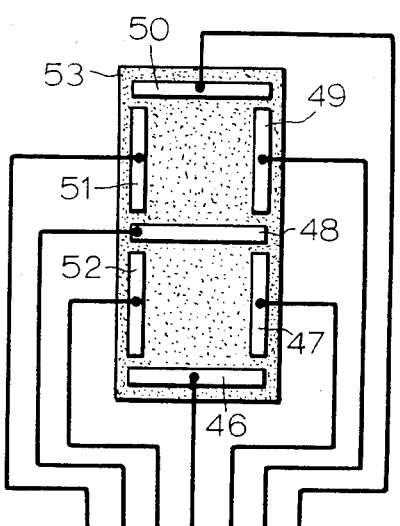
FIG. 3 is an enlarged top view of one arrangement of transducer elements suitable for use in the system of FIG. 2.

For launching or projecting acoustic wavefronts 37 in medium 31 and across the path of light beam 33, the system of FIG. 2 further includes a transducer system 38, best seen in FIG. 3, located at one end of cell 30. Transducer system 38 includes a plurality of individual transducer elements, independent either effectively or in actuality, selectively energizable by a matrix selector 40 associated with a signal generator 41. In this case, transducer system is an effectively independent plurality of transducer elements which are, however, all physically a part of a slab 43 of piezoelectric material such as quartz or barium titanate. A single electrode 44 covers the entire exterior surface of slab 43. On the other surface of slab 43, facing medium 31, are a plurality of mutually spaced and particularly arranged electrodes 46–52, as best seen in FIG. 3. All of the different electrodes may be deposited on slab 43 in the form of gold films. Of course, the spaced electrodes could instead be deposited on the exterior surface of slab 43, and the single electrode 44 deposited on the surface facing the medium. In either case, each of electrodes 46–52 is individually connected, by a respective one of different leads, to one side of matrix selector 40, while common electrode 44 (FIG. 2) is connected by a lead to the other side of the selector. Consequently, each individual different one of electrodes 46–52 is capable of coacting with electrode 44 so as to constitute a uniquely located independent, separately energizable transducer element.

In a first form of operation, signal generator 41 develops an output at a fixed sound frequency suitable for obtaining Bragg interaction with the light of beam 33 as set forth in the aforementioned reference. One or more of electrodes 46–52 are addressed by selector 40, which distributes the generator output as a corresponding one or more information signals. That is, one or more transducer elements are simultaneously energized in a selectively chosen one of a plurality of possible combinations or energization patterns, with each different element combination corresponding to a respective different spatial pattern, here an alphanumeric character. Thus each of the character-defining transducer-element combinations is associated with a unique combination of information signals from matrix selector 40. The selected transducer energization pattern may be changed with time by the selection of others of the plurality of possible transducer energization combinations or patterns by causing matrix selector 40 to address with a different combination of information signals. Merely by adjusting the intensity of appropriate ones of the information signals, those elements which are addressed at any given time may be energized at respective different intensity levels, or an entire character-defining combination of elements may be energized at one given level, while other such combinations are energized at other levels; in this manner, a gray-scale capability is readily provided.

In any case, the selected pattern is reproduced as a corresponding field of acoustic waves projected in medium 31 across the light beam. The particular field of acoustic waves (or sound pressure regions) produced at any given time interacts with the light in beam 33 in essentially the same manner as occurs in the system of FIG. 1 wherein the acoustic field is the result of an object or specimen intentionally placed in the path of otherwise uniformally distributed sound wave energy. In the case of FIG. 2, however, the optical imaging system is arranged, by positioning lens 35, so as to image the sound-wave cross-section at the surface of transducer 38 upon the image plane. Consequently, the interaction of the light with the acoustic field bearing information as to the transducer energization pattern in the system of FIG. 2 and the action of lens 35 serve to produce in an image plane an optical spatial representation of the corresponding transducer energization patterns. The intensity of this representation, or of its various parts, will be proportional to the intensity level of the transducer element or combination which gave rise to it.

Figures 4A, 4B:
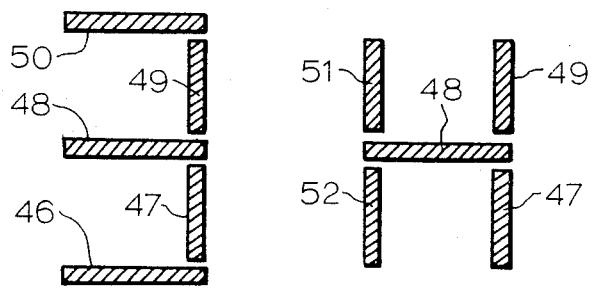
FIG. 4A and 4B illustrate examples of different alphanumeric characters which may be displayed by the system of FIG. 2, while also illustrating the corresponding selection of different elements of the transducer arrangement of FIG. 3.

For example, when at any given moment only electrodes 46–50 are energized by selector 40 together with back-electrode 44, the numeral "3" is formed on the image plane; this particular pattern of selection is illustrated in FIG. 4A. If reversed, it will be observed that the same arrangement forms the character "E." As similarly represented in FIG. 4B, the selection of only transducer electrodes 47–49 and 51, together with common electrode 44, results in the formation of the numeral "4." Again, it may be observed that, by turning the arrangement of FIG. 4B upside down, the letter "H" is formed. By so selectively choosing which combination of the different individual transducer elements are energized at any given instant, it will be apparent that a wide variety of letters or numerals may be displayed, in projected light, on the image plane.

Figure 6:
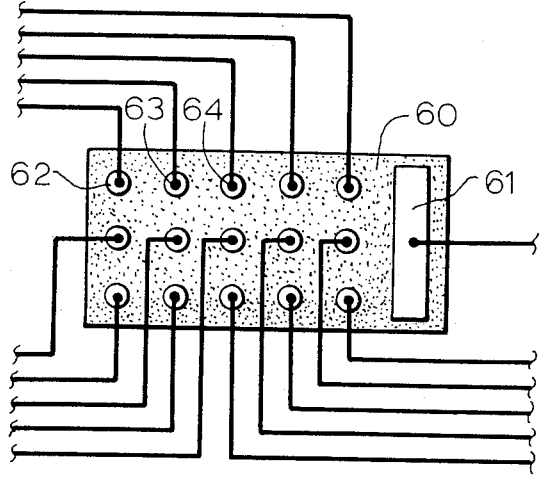
FIG. 6 is an enlarged top view of another arrangement of transducer elements suitable for use in the systems of FIG. 2 and FIG. 7.

Also, a different configuration of transducers could be used for special purposes, as suggested in FIG. 6, for example, an array of dot elements in a matrix formation. Such a transducer element configuration would be useful for digital displays, for memory applications, and even for the display of spatial patterns which constitute image of various objects. The gray-scale capability described above is of course especially useful in this latter case. Furthermore, such an array could be addressed not only by energizing a selected plurality of elements simultaneously at any given time, but also by sequentially energizing one or more elements, for example an entire row of elements, in scanned fashion, merely by causing selector 40 to supply the corresponding information signals sequentially with time.

Figure 5:
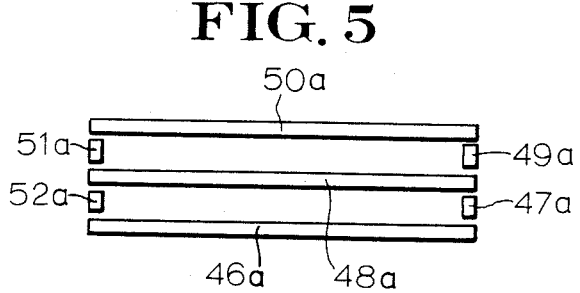
FIG. 5 illustrates an arrangement of transducer alternative to that of FIG. 3 to compensate distortion effects.

The compensation for the inherent demagnification factor discussed above may also be accomplished by dimensioning the transducer elements, rather than by anamorphic optical means, i.e., the individual transducer elements may be disposed or arranged to define an aspect ratio that compensates for this. This is illustrated in FIG. 5 wherein electrode 48a–52a define an overall pattern that is much narrowed in one dimension as compared to the normal aspect ratio.

Figure 7:
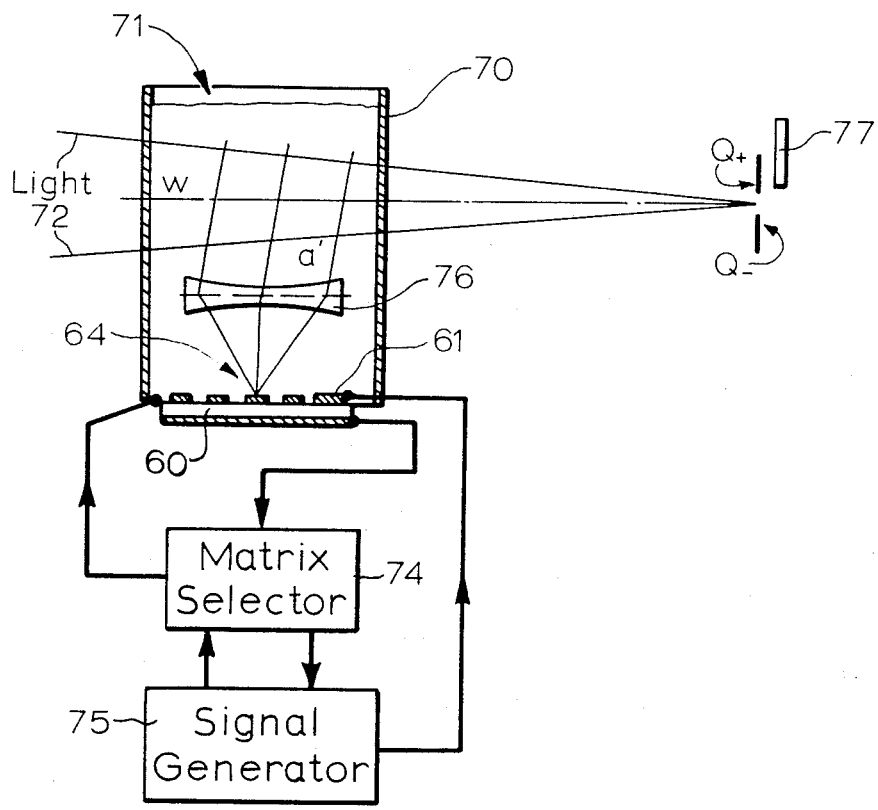
FIG. 7 is a schematic, partially in block diagram form of a system which translates an acoustic field bearing character information into an analogue light field.

The system of FIG. 7 is similar to that of FIG. 3 in that it also includes a like sound cell 70, medium 71, and beam 72 focused through cell 70. However, the transducer system 60, best seen in FIG. 6, is located at one end of cell. All of the elements of the transducer system 60 are constituted as in the FIG. 2 system, except that they are a matrix pattern of dot transducers as illustrated in FIG. 6. It differs however from FIG. 2 primarily in that one of its elements 61 (which could also be a collection of elements) is made to serve as a reference. Reference element 61 is positioned so as to be spatially separated from the remaining elements, and is energized substantially more strongly than the other elements of the transducer system, exemplary ones of which are 62, 63 and 64. The alphanumeric-defining transducer matrix of FIGS. 2 and 3 could also serve, provided a reference element such as element 61 is likewise added to that transducer system and appropriately energized. In either case, each individual one of the transducer elements such as 46 and 47, or 62 and 63, is independently energizable and is effectively a uniquely located and independent transducer. As in FIG. 2, each of the elements is energizable by a matrix selector 74 associated with a signal generator 75.

The system of FIG. 7 further differs from that of FIG. 3 in that acoustic lens 76, preferably a spherical one, and of any well known construction, is focused on the transducer pattern and positioned with its Fourier transform plane within that volume of the medium 71 which is illuminated by beam 72; the axis of the lens 76 is oriented so as to be transverse to the direction of propagation of the light beam. As in the FIG. 3 system, Bragg diffraction images $Q^-$ and $Q^+$ are developed beyond the cell 70 opposite the side of entry of beam 72. However, as will be explained more fully below, the brightness distribution which constitutes the Bragg diffraction images $Q^+$ and $Q^-$ is in fact a hologram of the pattern formed by the transducer elements 62, 63 etc., exclusive of the reference element 61. A photographic film or plate 77 is placed at $Q^+$ so that one of such Bragg images is recorded.

Now setting forth the operation of the system in more detail, transducer element 61 is energized by generator 75 to form a reference sound beam in the medium 71, while at the same time elements 62, 63 etc. are energized singly or in any desired combination or set by matrix selector 74 and generator 75 to form an information-carrying acoustic field as in the FIG. 3 system, changing as one or more elements change between on and off states. The elements may be actuated to form not only an arbitrary dot pattern but also a pattern which constitutes an image of some chosen object, with, for example, various elements energized at differing power levels for a gray-scale effect, or simply in on and off manner, as was described earlier in connection with FIG. 2. However, as is illustrated, each element of the transducer system 60 in combination with sound lens 76 generates beyond the lens a plane wave $a'$ which intersects the Fourier transform plane of lens 76 at an angle which depends on the position of the transducer element relative to the axis of the lens. Both the reference acoustic field and information acoustic field are characterized by a like frequency, since all the transducer elements are ultimately powered by generator 75 as the common energizing source. Thus the reference and information sound field will beat with each other, and the sound intensity distribution in plane W is a complicated interference pattern formed by all the plane waves generated by all the transducer elements, but because the waves generated by reference element 61 are substantially stronger than the others, this interference pattern is in fact a hologram made with the plane waves generated by element 61 as reference. With the normal process of Bragg diffraction imaging as earlier described, this intensity distribution is imaged at $Q^+$ and $Q^-$, representing the upshifted and downshifted Bragg images, with one of these being recorded by the suitably positioned photographic film 77. To prevent overloading of the system, it may be advisable to address the various transducer elements with random phases, thereby preventing accidental sound energy concentration in this Fourier transform plane.

The same holographic principles may be applied in the context of the system of FIG. 1 to provide a completely new holographic capability therein. The FIG. 1 system is modified to add an additional transducer spatially separated from transducer 20 and energized by the same generator 21 to serve as a generator of a reference sound field within soundcell 15, just as in the FIG. 7 system. The only significant difference between the modified FIG. 1 system and that of FIG. 7 is that the information sound field is produced by an object 22 perturbing the originally uniform field generated by the original transducer 20, and of course that the soundcell is adapted to receive an object 22 for examination.

To reconstruct the original transducer pattern from the hologram, the film 77 is developed and placed in its original position at $Q^+$. This time, only transducer 61 is energized. The result is that in the space to the right of film 77, the original optical analogue of the sound amplitude distribution is reproduced (a conjugate field is also reproduced in a spatially separated position; it can be filtered out by conventional means well known in the art). The optical imaging system described in connection with FIGS. 1 and 2 may now be used to reproduce the original pattern of transducer elements at the image plane 15 from this optical analog field. Since this is a Bragg imaging process with its concomitant anamorphic properties as in the FIGS. 1 and 2 systems, the same correction means therein alluded to may be used to counteract such properties.

It should be noted that although the description has been given in terms of imaging the cross-section of the sound field coinciding with the Fourier transform plane of lens 77, other cross-sections serve just as well, as long as there is sufficient overlap of plane waves from the various transducer elements within such cross-sections. In fact, lens 77 may be left out, if these overlap conditions are satisfied. However the configuration which includes the lens is especially useful in that it produces a so-called Fourier hologram. This kind of hologram is insensitive to displacements in its own plane upon reconstruction.

As so far described, a given signal frequency from the signal generator of the systems has been assumed. In consequence, the position of all of the different possible image combinations upon the image plane is the same. Where, instead, it is desired that different ones of the characters be differently located on the image plane, the frequency of the energizing signal to the transducer elements may be changed as between one set of pattern-defining transducer elements and another. A change in position is obtained as a result of a change in the angle of light diffraction, in correspondence with the change in the sound frequency. Thus, in FIG. 2, selector 40 may feed a signal, by way of a lead 54, to generator 41 in order to vary the frequency of the output from the latter in correspondence with the choosing of respective different patterns, in this case alphanumeric characters. In this manner, and in using a long-persistence luminescent screen in the image plane, a plurality of different characters may be caused to exist simultaneously in side-by-side relationship, although each different one is produced individually over a different time interval. The frequency of the signal is preferably stepped as between each different character by the interval needed to avoid overlap.

Similarly, the generator 41 may be made to produce an output having a simultaneous plurality of frequency components. Matrix selector 40 modified by well-known techniques receives this plurality of components and distributes each such component as a set of information signals to a respective combination of pattern-defining transducer elements. This also creates a plurality of different patterns, in this case alphanumerics, in side-by-side relationship in the image plane, but accomplishes it in simultaneous fashion. Of course, this mode of operation obviates the need for a long-persistence screen to produce a simultaneous multiplicity of patterns. Similarly, any of the sets of information signals for a respective desired pattern may be assigned a plurality of frequency components of the generator output, to display one or more characters repeated side-by-side in the image plane, once for each such frequency component. As before, this frequency component is preferably chosen to be stepped as between each different character by the interval needed to avoid overlap in both the above cases.

Thus a highly advantageous system has been disclosed for translating sound-borne information in an unusual but highly effective manner, particularly spatial patterns, by establishing a number of spatially separated transducer elements within the soundcell and actuating various combinations of elements. Since the sound-borne information is immediately translated to coherent-light forms, the invention operates in a very direct manner while avoiding complex apparatus and steps, thus insuring speed and reliability. Yet the invention has been shown to possess an unusual degree of flexibility beyond that of the usual character display or imaging system, particularly in the possibility of multiplied imaging and holographic capability. As was demonstrated the latter capability is useful not only for alphanumeric and similar applications but also to create a sound pattern holographically representative of an object, then rendering it in optical analogue form.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Acousto-optic information translation system for use with a spatially-coherent input light beam for converting by Bragg diffraction imaging input electrical signals representing characters directly into optical images portraying said characters, said system comprising:

a Bragg-type light-sound interaction cell disposed in said beam and including a sound-propagative medium transmissive of said beam;

transducer means coupled to said medium and including a plurality of spatially independent transducer elements for receiving input electrical signals representing characters and for being excited by said input signals in patterns whose spatial configurations represent characters, said excited patterns of transducer elements launching in said cell acoustic sound fields comprising a volume distribution of wave amplitudes and phases which are descriptive of said character spatial configurations established by said patterns of excited, transducer elements; and means including means directing said light beam through said cell in convergent or divergent wavefronts for establishing Bragg interaction between said light beam and said acoustic fields and for converting said character-descriptive acoustic fields into analogue optical fields portraying said characters.

2. Apparatus as in claim 1 which further includes optical means receptive of said optical field for imaging an optical analog pattern representative of any selected cross-section of said sound field.

3. Apparatus as in claim 2 in which said imaged cross-section is located at the transducer elements.

4. Apparatus as in claim 1 in which different ones of said elements are energized at different times to change the transducer energization pattern with time.

5. Apparatus as in claim 1 in which different ones of said elements are energized at respective different intensity levels.

6. Apparatus as in claim 1 in which said interaction-establishing and converting means includes means for diverging said beam over its path through said cell.

7. A system as in claim 1 in which said elements are positioned in the form of a matrixed array.

8. A system as in claim 7 in which one or more elements of said array are sequentially energized in scanned fashion.

9. A system as in claim 7 in which one or more selected ones of said array are simultaneously energized, with the members of said energized plurality changing with time.

10. A system as in claim 1 in which said transducer elements may be energized in a predetermined plurality of patterns representative of a like plurality of characters and in which a different preselected combination of said signals is representative of each of said characters and its corresponding transducer energization pattern.

11. A system as in claim 1 which further includes means for compensating the demagnification factor inherent in said Bragg interaction.

12. A system as in claim 1 in which said elements are each representative of a character, and in which each of said signals is associated with one of said characters.

13. A system as in claim 1 in which one or more selected ones of said plurality of elements are sequentially energized by information signals which change in frequency with time.

14. A system as in claim 1 in which selected sets of said plurality of elements are each energized by a respective one of corresponding sets of information signals, each such set of signals differing in frequency from the other.

15. A system as in claim 1 in which one or more selected ones of said plurality of elements are energized by information signals having a predetermined plurality of frequency components.

16. An acousto-optic system utilizing a spatially coherent light beam for translating an acoustic field bearing image information into a light field bearing holographic information as to said image comprising:

a light-sound interaction cell containing a sound-and-light-transmissive medium;

means for establishing an acoustic field bearing image information within said medium;

means for establishing within said medium a reference acoustic field for beating with said information field;

means directing said beam across said medium in convergent or divergent wavefronts for establishing interaction between said acoustic fields and said beam to produce by Bragg diffraction imaging at least one light field bearing said holographic information representative of said image.

17. A system as in claim 16 in which said means for establishing an information-bearing acoustic field includes:

a transducer coupled to said medium for producing a substantially uniform acoustic field in said medium; and means adapted to receive an object to be examined within said medium to establish non-uniformities in said acoustic field to thereby constitute said information-bearing acoustic field.

18. A system as in claim 16 in which said means for establishing an information-bearing acoustic field includes:

a plurality of independent separately energizable transducer elements for the creation of said acoustic field within said cell bearing information as to the transducer energization pattern.

19. A system as in claim 18 in which said means for establishing said reference field includes additional transducer means spatially separated from said plurality of transducer elements, said additional transducer means being energized substantially more strongly than said plurality of elements.

20. A system as in claim 19 in which both said additional transducer means and said plurality of transducer elements are energized from a single signal source.

21. A system as in claim 16 which further includes an acoustic lens means placed in said medium to focus on said transducer elements and with its Fourier transform plane within the volume of said medium which is illuminated by said beam.

22. A system as in claim 16 which further includes means placed within said light field for photographically recording said field, to thereby produce a hologram representative of said image.

* * * * *